(12) United States Patent
Yamamoto et al.

(10) Patent No.: US 7,854,413 B2
(45) Date of Patent: Dec. 21, 2010

(54) INSTALLING STRUCTURE OF WIRE HARNESS

(75) Inventors: Masataka Yamamoto, Kosai (JP); Keiji Mori, Kosai (JP)

(73) Assignee: Yazaki Corporation, Tokyo (JP)

( * ) Notice: Subject to any disclaimer, the term of this patent is extended or adjusted under 35 U.S.C. 154(b) by 402 days.

(21) Appl. No.: 11/838,324

(22) Filed: Aug. 14, 2007

(65) Prior Publication Data
US 2008/0035799 A1 Feb. 14, 2008

(30) Foreign Application Priority Data
Aug. 14, 2006 (JP) .............................. 2006-221007

(51) Int. Cl.
H02G 11/00 (2006.01)

(52) U.S. Cl. ..................... 248/49; 248/51; 174/72 A; 296/146.7

(58) Field of Classification Search ............... 248/49, 248/51, 52, 67.5, 70, 74.1, 291.1; 174/72 A, 174/68.1; 296/208, 155, 146, 146.7
See application file for complete search history.

(56) References Cited
U.S. PATENT DOCUMENTS 2,979,296 A * 4/1961 Groocock ................... 248/51
5,879,047 A * 3/1999 Yamaguchi et al. ...... 296/146.7
2007/0267211 A1* 11/2007 Yamamoto et al. ......... 174/68.1
2008/0035800 A1* 2/2008 Yamamoto ................... 248/70
2009/0101407 A1* 4/2009 Yamamoto ................ 174/72 A

FOREIGN PATENT DOCUMENTS

| JP | 2-92180 U | 7/1990 |
| JP | 4-112793 U | 9/1992 |
| JP | 526664 U | 4/1993 |
| JP | 5-93939 U | 12/1993 |
| JP | 10175483 A | 6/1998 |
| JP | 2000108674 A | 4/2000 |
| JP | 2001151042 A | 6/2001 |
| JP | 2001301545 A * | 10/2001 |
| JP | 2003252061 A | 9/2003 |
| JP | 2006042566 A | 2/2006 |
| JP | 2008061325 A * | 3/2008 |

OTHER PUBLICATIONS

Notification of Reasons for Refusal dated May 25, 2010 issued in counterpart Japanese Application No. 2006-221007.

* cited by examiner

*Primary Examiner*—Anita M King
(74) *Attorney, Agent, or Firm*—Sughrue Mion, PLLC

(57) ABSTRACT

An installing structure of a wire harness includes a link which has an end portion and is pivotally connected to a mating member by a shaft portion provided on the end portion. The wire harness extended from the mating member is installed along the link. A guide portion is provided at the end portion of the link. A slider for holding the wire harness is slidably engaged in the guide portion.

6 Claims, 18 Drawing Sheets

INSTALLING STRUCTURE OF WIRE HARNESS

BACKGROUND OF THE INVENTION

This invention relates to an installing structure of a wire harness on a link, in which the power supply wire harness is installed along the link, and the wire harness is bent in accordance with a pivotal movement of the link.

FIG. 22 shows one form of movable structural body storage structure employing a conventional link mechanism (see Patent Literature 1).

This movable structural body storage structure comprises a pair of front and rear pivotal links 52 and 53 pivotally connected to a vehicle body 51, an intermediate upper fixing link 55 connected to the front pivotal link 52, a front upper fixing link 54 connected to the rear pivotal link 53, a soft-top roof 56 fixed to the front upper fixing link 54.

In a completely-closed condition (not shown) of the roof 56, the front upper fixing link 54 and the intermediate upper fixing link 55 are arranged on a horizontal straight line, and the pair of front and rear pivotal links 52 and 53 are positioned generally upright. The pivotal links 52 and 53 are pivotally moved rearwardly from this condition (FIG. 22 shows a half-open condition of the roof), so that the fixing links 54 and 55 are superposed in a vertically-stepped manner, and in a stored condition (the open condition not shown) of the roof 56, the pivotal links 52 and 53 are positioned generally horizontally, and the fixing links 54 and 55 are disposed on the upper side of the pivotal links 52 and 53 in a folded manner.

Although a drive unit for the above link mechanism is not described, a structure (not shown) in which a link is driven by a motor and a pinion is described, for example, in Patent Literature 2.

Also, a structure for storing not the roof 56 but a rear window (rear glass panel) 57 of a roof 56' in a luggage space at a rear portion of a vehicle body has been developed as shown in FIG. 23. In this case, the rear window 57 can be stored separately from the roof 56', and then the roof 56' can be stored by the link mechanism of FIG. 22.

In FIG. 23, the rear window 57 is connected to one pivotal link 58, and the pivotal link 58 is pivotally connected to a link bracket 59 by a shaft portion 60, and the link bracket 59 is fixed to the vehicle body. In FIG. 23, a solid line shows an attached condition of the rear window 57, and a dots-and-dash line shows a stored condition of the rear window 57.

Furthermore, a structure for opening not a roof or a rear window of an automobile but a side door by a link mechanism is described, for example, in Patent Literature 3. In this structure (not shown), the door is swingably connected to the vehicle body by a bendable link arm, and also a pair of front and rear horizontal parallel links are provided between the door and the vehicle body.

A wire harness is installed on and fixed to one link, and one side portion of the wire harness is installed along a bendable caterpillar-like exterior member on the door, while the other side portion of the wire harness is installed on the vehicle body (power source-side). Electric power is always or continuously supplied to auxiliary equipments on the door via the wire harness.

[Patent Literature 1] JP-A-2000-108674 Publication (FIGS. 1 to 5)

[Patent Literature 2] JP-A-2003-252061 Publication (FIG. 1)

[Patent Literature 3] JP-A-10-175483 Publication (FIGS. 5 and 9)

In the movable structural body storage structure as shown in FIG. 23, it is necessary to supply electric power to defogging-purpose heating wires (auxiliary equipment) on the rear window, and therefore a study has been made of installing the wire harness along the link. In this case, it has been earnestly desired that the wire harness be smoothly bent in accordance with the pivotal movement of the link without undergoing folding and an excessive concentration of stresses in the vicinity of the shaft portion.

The above problem should be solved not only for the rear window but also for other movable structural bodies (such as a roof and a door) connected to a mating member such as a vehicle body (fixed structural body) by a link.

SUMMARY OF THE INVENTION

With the above problem in view, it is an object of this invention to provide a structure of installing a wire harness on a link, in which the wire harness is installed along the link, and the wire harness can be smoothly bent in accordance with a pivotal movement of the link without undergoing folding and an excessive stress concentration in the vicinity of a shaft portion so as to enhance the bending durability of the wire harness, thereby enhancing the reliability of continuous supply of electric power.

The above object has been achieved by a structure of installing a wire harness on a link, the installing structure of a wire harness, comprising:

a link which has an end portion and is pivotally connected to a mating member by a shaft portion provided on the end portion, wherein the wire harness extended from the mating member is installed along the link;

wherein a guide portion is provided at the end portion of the link; and wherein a slider for holding the wire harness is slidably engaged in the guide portion.

With this construction, in accordance with the pivotal movement of the link, the slider slides along the guide portion provided at the end portion of the link, and the wire harness is moved together with the slider, and the wire harness is smoothly bent with a large radius at the end portion of the link without undergoing folding and an excessive stress concentration. Therefore, the durability of the bending portion of the wire harness is enhanced. Preferably, the guide portion is a guide hole, a guide groove or a guide rail of an elongate shape (an arc-shape or a straight shape). The mating member is a link bracket, a fixed link, a movable link or the like.

Preferably, a base plate is provided on the end portion of the link. The guide portion is provided on the base plate.

With this construction, even if the thickness of the link is small, the guide portion can be positively formed by the base plate. One example of the guide portion can be provided by an arrangement in which the guide hole is formed through the base plate, and the base plate is fixed to the link, so that the guide hole is closed by the link to provide a guide groove. Another example can be provided by an arrangement in which the base plate is made larger in width than the link so as to increase the length of the guide portion (the amount of sliding movement of the slider), and the length of the bending portion (surplus portion) of the wire harness is increased so that the bending of the wire harness can be effected more smoothly.

Preferably, the guide portion has a generally arc-shape, and is disposed in concentric relation to the shaft portion.

With this construction, in accordance with the pivotal movement of the link, the slider, while sliding along the arc-shaped guide portion, is held in a predetermined position (that is, the guide portion is moved while leaving the slider in the predetermined position), and the wire harness is smoothly bent about the slider (serving as a support point) along a predetermined locus in such a manner that the wire harness passes over the shaft portion or the vicinity of the shaft portion. When the link is pivotally moved forwardly, the wire harness is bent or turned forwardly about the slider, and when the link is pivotally moved rearwardly, the wire harness is bent or turned rearwardly about the slider.

Preferably, a pair of the guide portions are respectively provided at opposite sides of the shaft portion, and are extended straight. A pair of the sliders are engaged in the pair of guide portions, respectively. A part of the wire harness installed at the end portion has a surplus length.

With this construction, in accordance with the pivotal movement of the link, the pair of sliders move along the respective guide portions independently of each other, and the wire harness is bent in accordance with the movements of the sliders, and the surplus length at the end portion of the link is absorbed, and is also released to allow the wire harness to be bent with a large radius, thus reducing a bending stress. Namely, when the link is positioned in intersecting relation to the mating member, the wire harness is supported at the end portion of the link by the two parallel-disposed sliders moved in the same direction, and is bent with the large radius. When the link is positioned in line with the mating member, the wire harness is supported by the two sliders moved respectively in opposite directions, and is bent into a generally S-shape.

Preferably, the guide portion extends straight so as to pass a center of the shaft portion. The slider for holding the wire harness by its at least one clamp portion is engaged in the guide portion. A part of the wire harness installed at the end portion has a surplus length.

With this construction, in accordance with the pivotal movement of the link, the slider moves along the guide portion to pass over the shaft portion, and the wire harness, while having a surplus length, is smoothly bent along a path disposed radially outwardly of the shaft portion. When the link is pivotally moved in the normal and reverse directions, the slider is moved along the guide portion in opposite directions. In the case where the two clamp portions are used, the wire harness is bent with a larger radius as compared with the case where one clamp portion is used.

Preferably, the guide portion projects into a generally L shape in an axis direction of the shaft portion. A part of the wire harness installed at the end portion has a surplus length.

With this construction, in accordance with the pivotal movement of the link, the slider moves along the generally mountain-shaped guide portion while displaced in the direction of the thickness of the link (that is, away from and toward the link), and the wire harness is moved together with the slider along the guide portion, and is bent three-dimensionally. When the link is pivotally moved in a normal direction, the slider is moved to one end of the guide portion, and when the link is pivotally moved in a reverse direction, the slider is moved to the other end of the guide portion, and when the link is positioned in line with the mating member, the slider is positioned at an apex portion of the guide portion.

In the above configuration, in accordance with the pivotal movement of the link, the wire harness is moved together with the slider along the guide portion provided at the end portion of the link, and is smoothly bent, and therefore the durability of the bending portion of the wire harness is enhanced, and the reliability of continuous supply of electric power to the link-side is enhanced.

In the above configuration, even if the thickness of the link is small, the guide portion can be positively formed by the base plate. Also, the base plate can be made larger in width than the link so as to increase the length of the guide portion (that is, the amount of sliding movement of the slider), and with this arrangement the wire harness can be bent with a large radius, so that the bending durability can be further enhanced.

In the above configuration, when the link is pivotally moved, the slider is held in the predetermined position near to the shaft portion, and the wire harness held by this slider is smoothly bent at the center of the shaft portion or the vicinity thereof, and therefore a load acting on the bent portion of the wire harness is reduced, and the bending durability of the wire harness is enhanced, and the reliability of continuous supply of electric power is enhanced.

In the above configuration, the wire harness is supported by the pair of sliders movable independently of each other, and when the link is positioned in line with the mating member, the wire harness is bent into a generally S-shape, thereby absorbing the surplus length thereof, and when the link is pivotally moved, the surplus length is released, so that the wire harness is bent with a large radius. Therefore, the bending durability of the wire harness is enhanced, and the reliability of continuous supply of electric power is enhanced.

In the above configuration, in accordance with the pivotal movement of the link, the wire harness is moved together with the slider, and is smoothly bent while having a surplus length, and therefore the folding of the wire harness and the concentration of stresses thereon are prevented, and the bending durability of the wire harness is enhanced, and the reliability of continuous supply of electric power is enhanced. When the two clamp portions are used, the wire harness can be bent with a large radius, and the above advantageous effects are enhanced.

In the above configuration, in accordance with the pivotal movement of the link, the wire harness is moved along the guide portion while displaced away from and toward the link, and is smoothly bent with a large radius, and therefore the folding of the wire harness and the concentration of stresses thereon are prevented, and the bending durability of the wire harness is enhanced, and the reliability of continuous supply of electric power is enhanced.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

FIGS. 1 to 5 show a first embodiment of an installation structure (of installing a wire harness on a link) of the present invention. In this embodiment, the link is so designed as to store a rear window (not shown) of an automobile in a luggage space (not shown) at a rear portion of a vehicle body.

Figure 1:
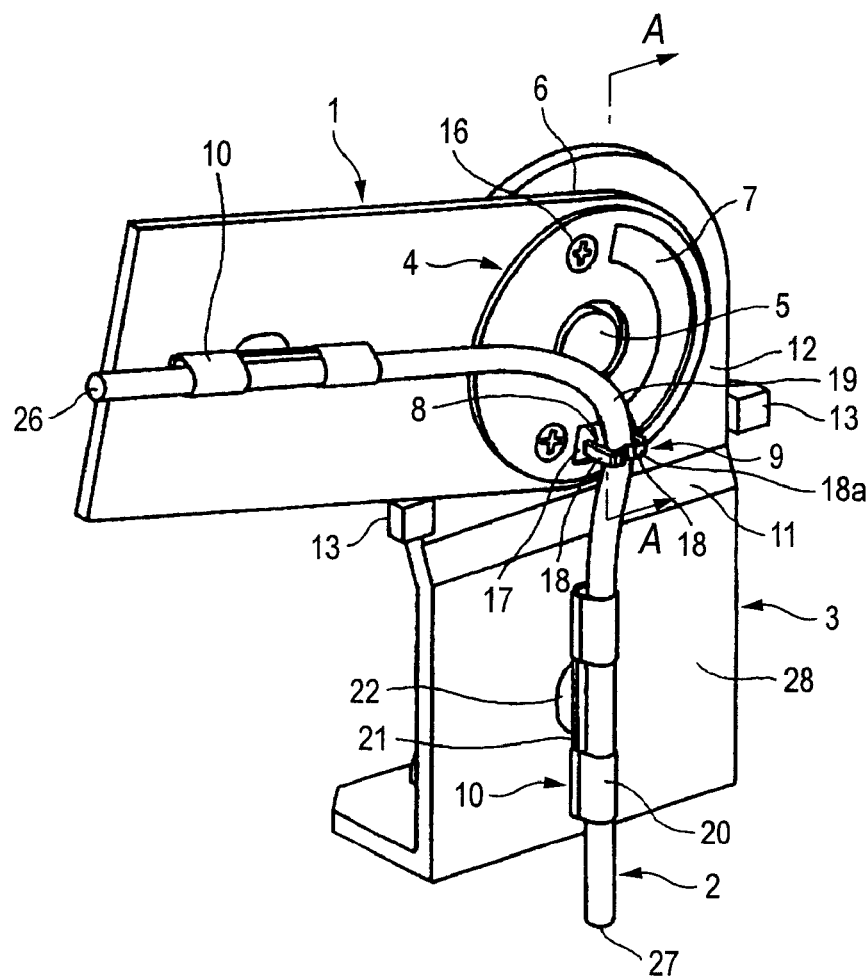
FIG. 1 is a perspective view of a first embodiment of a wire harness installation structure (of installing a wire harness on a link) of the present invention, showing a pivotal movement start position of the link.
Figure 2:
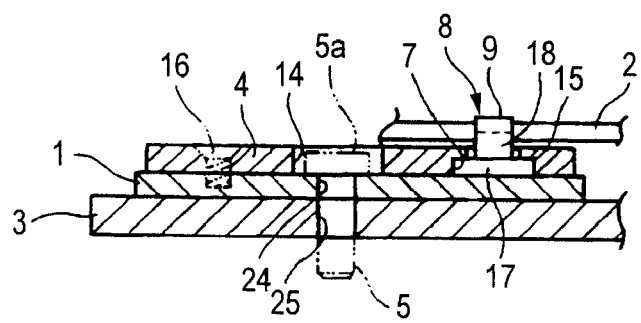
FIG. 2 is a cross-sectional view taken along the line A-A of FIG. 1.
Figure 3:
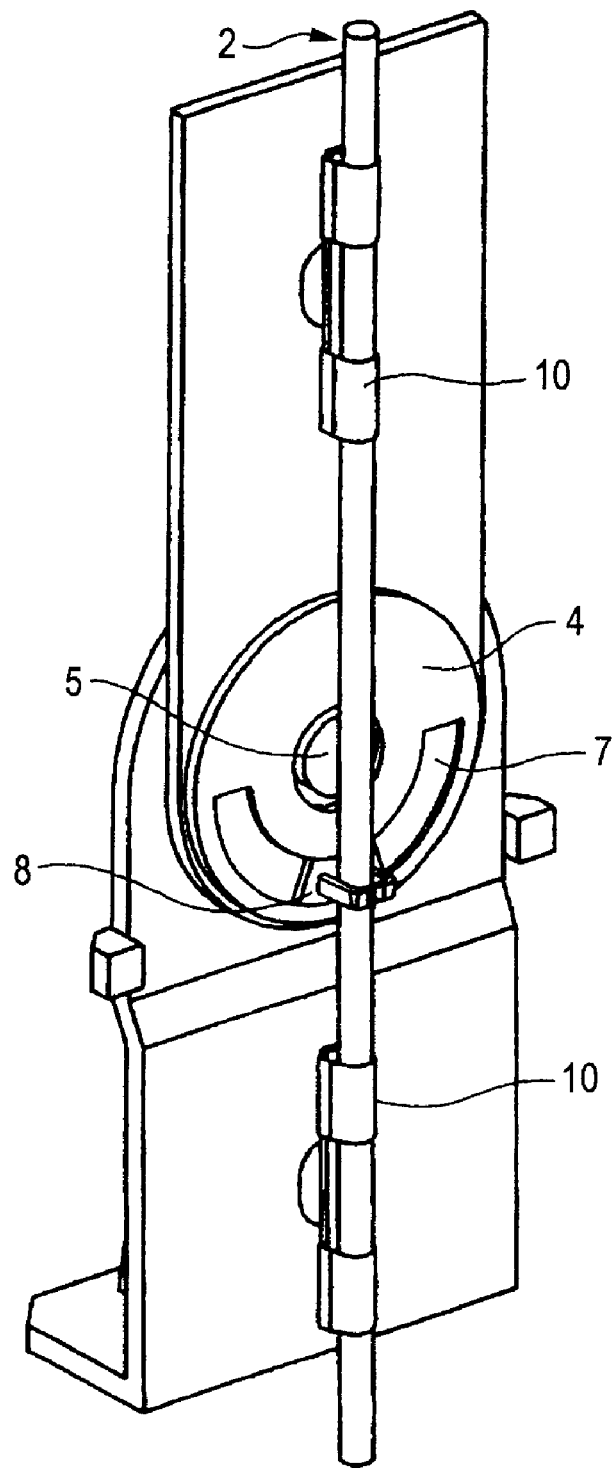
FIG. 3 is a perspective view showing a half angularly-moved condition of the link of the first embodiment.
Figure 4:
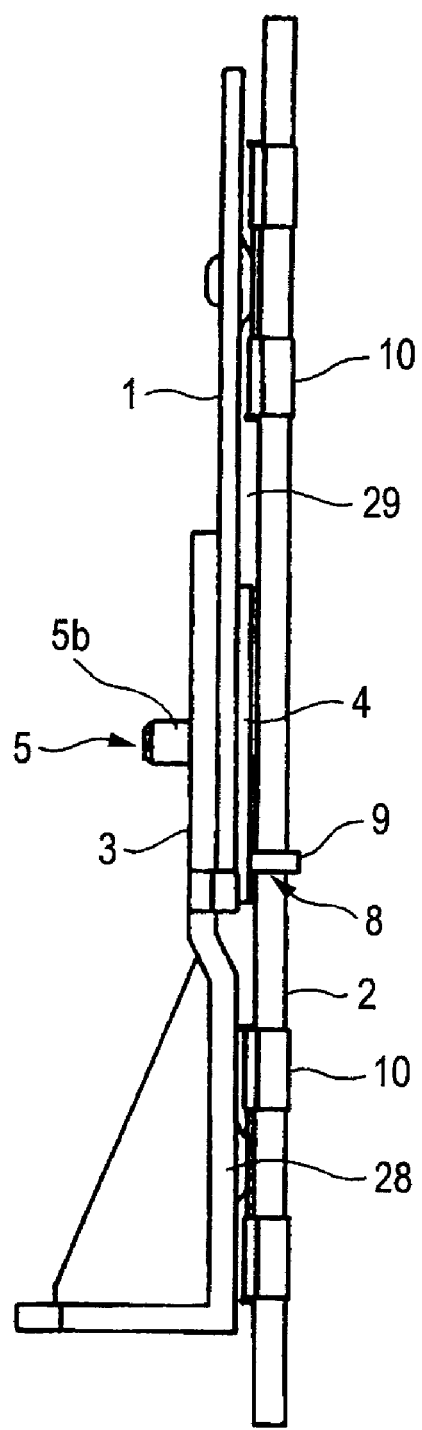
FIG. 4 is a side-elevational view showing the half angularly-moved condition of the link.
Figure 5:
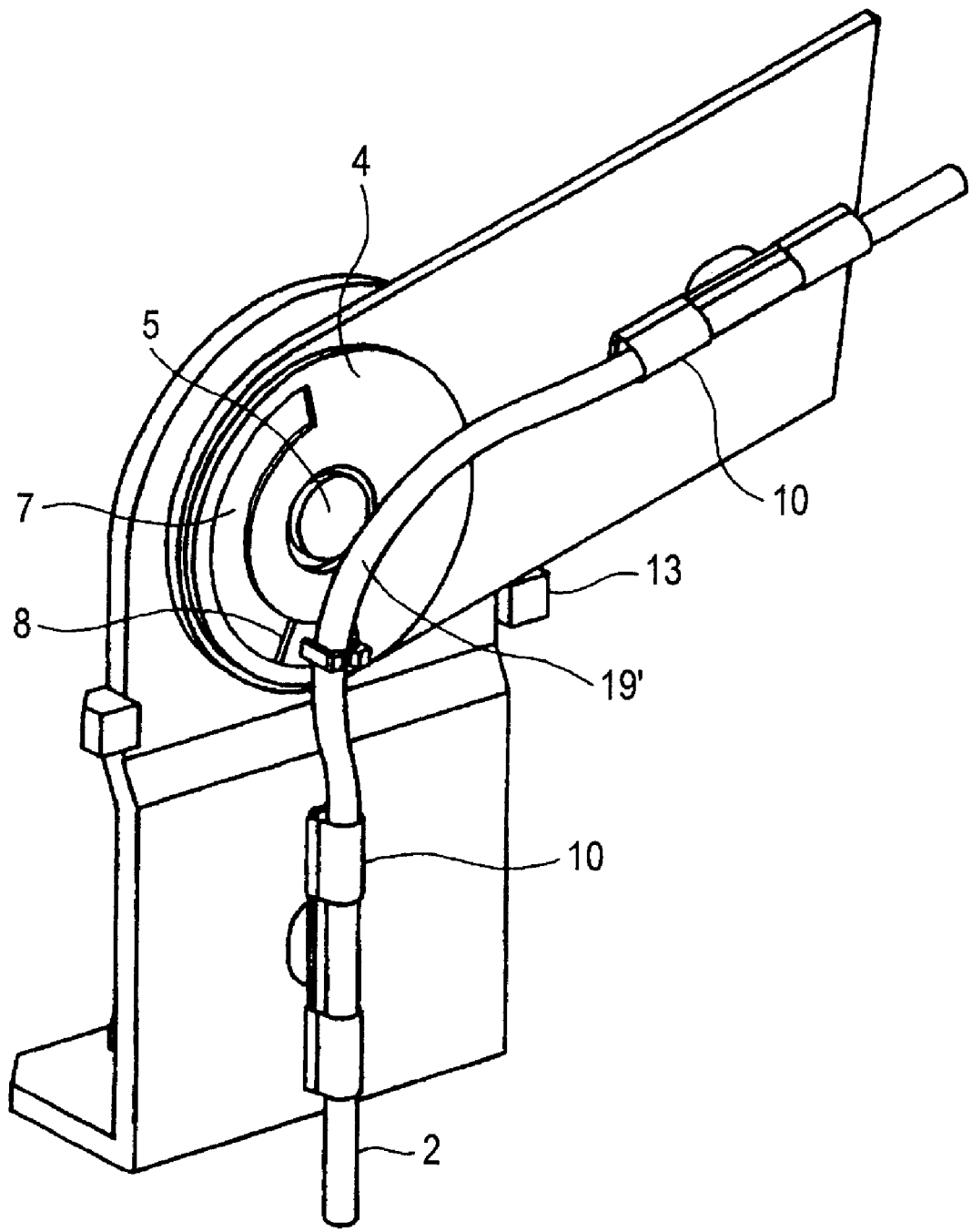
FIG. 5 is a perspective view showing a pivotal movement end position of the link.

FIG. 1 is a view showing a closed condition of the rear window (movable structural body) in which the link 1 is pivotally moved forwardly toward the front of the vehicle to be disposed in a slightly upwardly-slanting position relative to a horizontal direction, FIG. 2 is a cross-sectional view taken along the line A-A of FIG. 1, showing an important portion, FIGS. 3 and 4 are views showing a condition in which the link 1 stands up vertically in a half-open condition of the rear window, and FIG. 5 is a view showing an open condition of the rear window (that is, a condition in which the rear window is stored in the luggage space) in which the link 1 is pivotally moved rearwardly toward the rear of the vehicle to be disposed in a slightly upwardly-slanting position relative to the horizontal direction. The link 1 and the wire harness 2 are shown as cut at suitable portions thereof. In the present specification, the front, rear, upper, lower, left and right sides correspond respectively to the front, rear, upper, lower, left and right sides of the vehicle.

As shown in FIG. 1, the link 1 is pivotally (swingably) connected to a link bracket (mating member) 3 by a shaft portion 5, and a base plate 4 of a circular shape is fixed to a flat outer surface of a shaft portion-side end portion 6 of the link 1. An arc-shaped (generally semi-circular) guide hole (guide portion) 7 is formed in the base plate 4, and a slider 8 is slidably engaged in the guide hole 7. A harness clamp portion (holding portion) 9 is provided at the slider 8, and the wire harness 2 is fixed to the link bracket 3 and the link 1 by respective fixing members 10, and at a region between the two fixing members 10, the wire harness 2 is passed through the clamp portion 9.

The link 1 is made of metal or a synthetic resin, and is in the form of a relatively-wide plate. The one end portion 6 of the link 1 is connected to the link bracket 3, and the other end portion thereof (not shown) is connected to a fixed link or the like on the rear window. The link bracket 3 is made of metal or a synthetic resin, and has a step portion 11 formed at an intermediate portion thereof. At the inner side of the step portion 11, the link 1 and the base plate 4 are disposed at an upper half portion 12 of the link bracket 3, and a lower end portion of the link bracket 3 is fixed to the vehicle body (fixed structural body) (not shown). Two stopper projections 13 are formed respectively at opposite side edges of the link bracket 3, and are disposed near to the step portion 11, and the link 1 abuts against the left (FIG. 1) stopper projection 13 at a pivotal movement start position, and also abuts against the right stopper projection 13 at a pivotal movement end position.

The base plate 4 is made of metal or a synthetic resin, and has a hole 14 (FIG. 2) for the passage of the shaft portion 5 therethrough, and the hole 14 is larger in diameter than a head 5a (FIG. 2) of the shaft portion 5. The shaft portion 5 is disposed in concentric relation to the guide hole 7 of the base plate 4. As shown in FIG. 2, the guide hole 7 is formed through the base plate 4, and has a step portion 15 formed intermediate of a depth thereof, and has a generally convex transverse cross-section. The base plate 4 is mated with an outer surface of the link 1, and is fixed thereto by small screws 16 (FIG. 1) or the like, and the guide hole 7 is closed at its bottom opening by the outer surface of the link 1 to provide a guide groove. For convenience' sake, the position of the screw 16 in FIG. 2 is different from that in FIG. 1.

As shown in FIGS. 1 and 2, a base plate portion 17 of the slider 8 is slidably engaged in the guide hole 7, and the clamp portion 9 comprising a pair of holding piece portions 18 is formed integrally on and projects from the base plate portion 17. Preferably, the slider 8 is formed of a synthetic resin having good sliding properties. Like the guide hole 7, the base plate portion 17 has an arc-shape (sector-shape). Each of the holding piece portions 18 has elasticity, and has an inwardly-inclined claw 18a formed at its distal end. The wire harness 2 is brought into contact with outer surfaces of the claws 18a, and then is smoothly inserted between the holding piece portions 18 while elastically deforming these holding piece portions 18 outwardly, that is, away from each other.

As shown in FIG. 1, the wire harness 2 is fixed to the link 1 by the fixing member 10 positioned relatively near to the base plate 4 and disposed generally centrally of the width of the link 1. Also, the wire harness 2 is fixed to the link bracket 3 by the other fixing member 10 positioned relatively near to the base plate 4 and disposed generally centrally of the width of the link bracket 3. At a region between the two fixing members 10, the wire harness 2, while passing the center of the shaft portion 5 or the vicinity of the center of the shaft portion 5 (which is slightly downwardly offset from the center of the shaft portion 5), is bent with a large radius generally equal to that of the base plate 4, and a lower portion of this bent portion 19 is supported by the slider 8.

Preferably, the two fixing members 10 are generally equidistant from the shaft portion 5 so that the wire harness 2 can be suitably bent to pass over the shaft portion 5. The reason is that the more the bent portion 19, 19' (FIG. 1 and FIG. 5) of the wire harness 2 is away from the center of the shaft portion 5, the larger load acts on the bent portion 19, 19' during the pivotal movement of the link 1 in the forward or rearward direction.

Preferably, each fixing member 10 is made of metal, and includes a pair of gripping portion (clamping portions) 20 for fixing the wire harness 2, an interconnecting portion 21 interconnecting the pair of gripping portions 20, a base portion 22 formed integrally on the interconnecting portion 21, and a shank portion (an externally-threaded portion or a press-fastening portion) formed on and projecting from the base portion 22. The shank portion extends through a hole formed through a respective one of the link 1 and the link bracket 3, and is fixed by a nut or by press-deforming a distal end portion of the shank portion. The fixing member 10 is not limited to this configuration, and any other suitable fixing member can be used in so far as it can position and fix the wire harness 2 relative to the link 1 or the link bracket 3 in the longitudinal direction thereof.

The wire harness 2 can comprise a plurality of (for example, two) insulated sheathed wires having a vinyl tape roughly wound thereon or covered with a flexible net-like tube (made of a synthetic resin), or a plurality of wires which are not tied together can be used as the wire harness.

In the attached condition of the rear window (FIG. 1), the link 1 is directed toward the front of the vehicle, and the arc-shaped guide hole 7 is disposed vertically, that is, in the upward-downward direction, at a rear half portion of the base plate 4, and the slider 8 is positioned at a lower end of the guide hole 7, and that portion 26 of the wire harness 2 extending along the link 1 is connected to an auxiliary equipment on the rear window, and that portion 27 of the wire harness 2 extending along the link bracket 3 is installed on and connected to the vehicle body (power source-side).

As the rear window is opened from the condition of FIG. 1 by driving the link 1 by a drive unit (not shown) comprising, for example, a motor and a pinion, the link 1, together with the wire harness 2, is pivotally moved clockwise rearwardly toward the rear of the vehicle as shown in FIG. 5 via the upstanding condition of FIGS. 3 and 4. In FIG. 3, the wire harness 2 extends straight vertically, and passes the center of the shaft portion 5. The shaft portion 5 and the upper and lower fixing members 10 are disposed on a vertical straight line. The semi-circular guide hole 7 is disposed forward-rearward symmetrically at a lower half portion of the base plate 4. The slider 8 is positioned at a lowermost portion of the guide hole 7. The link 1 and the base plate 4 are angularly rotated in unison.

As shown in FIG. 4, the link 1 and the upper half portion of the link bracket 3 are disposed in sliding contact with each other, and a lower half portion 28 of the link bracket 3 and the link 1 are disposed generally on a common plane, and the wire harness 2 is disposed parallel to the link 1 and the link bracket 3, with a slight gap 29 formed therebetween.

In FIG. 5, the link 1 is directed rearwardly, and is disposed in a slightly upwardly-slanting condition relative to the horizontal direction, and abuts against the rear stopper projection 13 to be stopped there. The guide hole 7 is disposed vertically, that is, in the upward-downward direction, at a front half portion of the base plate 4, and the slider 8 is disposed at a lower end of the guide hole 7, and the wire harness 2, while passing slightly below the center of the shaft portion 5, is smoothly bent, and this bent portion 19' extends to the two fixing members 10, and further extends straight along the link 1 and the link bracket 3.

When the link 1 is pivotally moved counterclockwise forwardly from the condition of FIG. 5 so as to close the rear window, the slider 8 slides along the guide hole 7 through an operation reverse to the above-mentioned operation, and the link is brought into the condition of FIG. 1 via the condition of FIG. 3.

As shown in FIGS. 1 to 5, in accordance with the pivotal movement of the link 1, the slider 8 holding the wire harness 2 slides along the arc-shaped guide hole 7 (concentric with the shaft portion 5) in the vicinity of the shaft portion 5, and the position of the slider 8 is always generally constant regardless of the angular position of the link 1, and therefore the wire harness 2 is smoothly bent with a large radius at the center of the shaft portion 5 or in the vicinity thereof, and the folding of the wire harness 2 and the excessive concentration of stresses on the wire harness 2 are prevented, and the bending durability is enhanced, and the reliability of continuous supply of electric power is enhanced.

In the above first embodiment, although the pair of elastic holding piece portions 18 are used as the harness clamp portion 9 of the slider 8, a band or the like for gripping the wire harness 2 over the entire periphery thereof can be used instead of the holding piece portions 18. Preferably, the clamp portion 9 holds the wire harness 2 in a manner to allow the wire harness 2 to be moved in the longitudinal direction thereof. The clamp portion 9 of FIG. 1 allows the wire harness 2 to be slightly moved in the longitudinal direction within the range corresponding to looseness of the wire harness 2 in accordance with the pivotal movement of the link 1. These examples of harness retaining portion 9 can be similarly applied to embodiments described later.

Furthermore, in the above first embodiment, the guide hole 7 serving as the guide portion is formed in the base plate 4, and the guide hole 7 is closed by the link 1 to provide the guide groove. However, there can be used, for example, an arrangement in which a guide groove is formed directly in the base plate 4, and a slider made of a synthetic resin, while elastically deformed, is pressed into this guide groove to be slidably engaged therein. There can also be used an arrangement in which the provision of the base plate 4 is omitted, and a guide groove is formed directly in the link 1. Furthermore, there can be used an arrangement in which a guide hole (7) is formed in the link 1, and is closed by the flat surface of the link bracket 3 to form a guide groove (In this case, however, the strength of the link 1 is decreased, and therefore the long guide hole can not be formed.). Furthermore, the base plate 4 is not limited to the circular shape, but can be formed into any other suitable shape such as a rectangular shape and a semi-circular shape. These examples of the guide portion, etc., can also be applied to the embodiments described later.

FIGS. 6 to 10 show a second embodiment of an installation structure (of installing a wire harness on a link) of the invention.

Referring to features of this structure, two parallel straight guide holes (guide portions) 31 and 32 are symmetrically formed in a base plate 30 of a circular shape provided at one end portion 6 of the link 1, and are disposed respectively on opposite sides of a shaft portion 5, and sliders 33 and 34 are slidably engaged respectively in the guide holes 31 and 32 independently of each other, and a wire harness 2 is held by clamp portions (harness holding portions) 9 of the two sliders 33 and 34. The other construction is similar to that of the first embodiment of FIGS. 1 to 5, and similar constituent portions will be designated by identical reference numerals, respectively, and detailed explanation thereof will be omitted.

Figure 6:
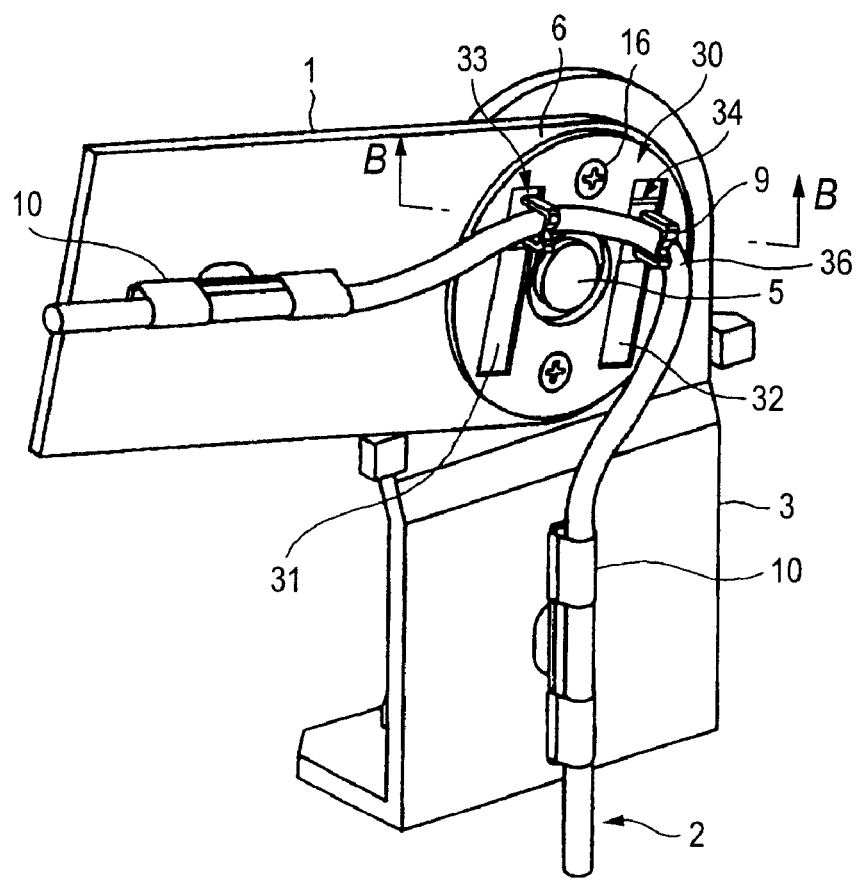
FIG. 6 is a perspective view of a second embodiment of a wire harness installation structure of the invention, showing a pivotal movement start position of a link.
Figure 7:
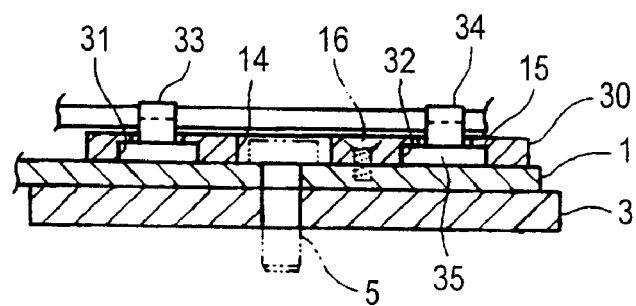
FIG. 7 is a cross-sectional view taken along the line B-B of FIG. 6.
Figure 8:
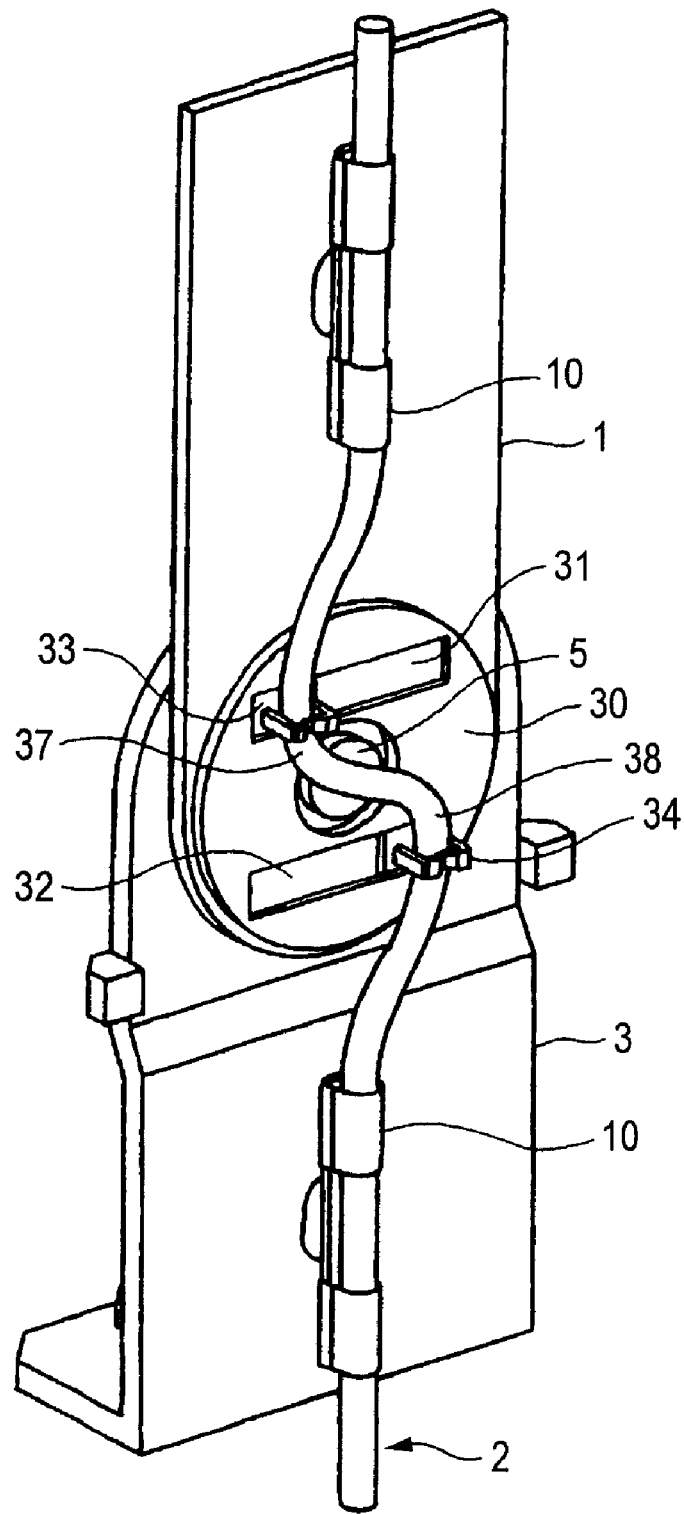
FIG. 8 is a perspective view showing a half angularly-moved condition of the link of the second embodiment is in the process of being angular moved.
Figure 9:
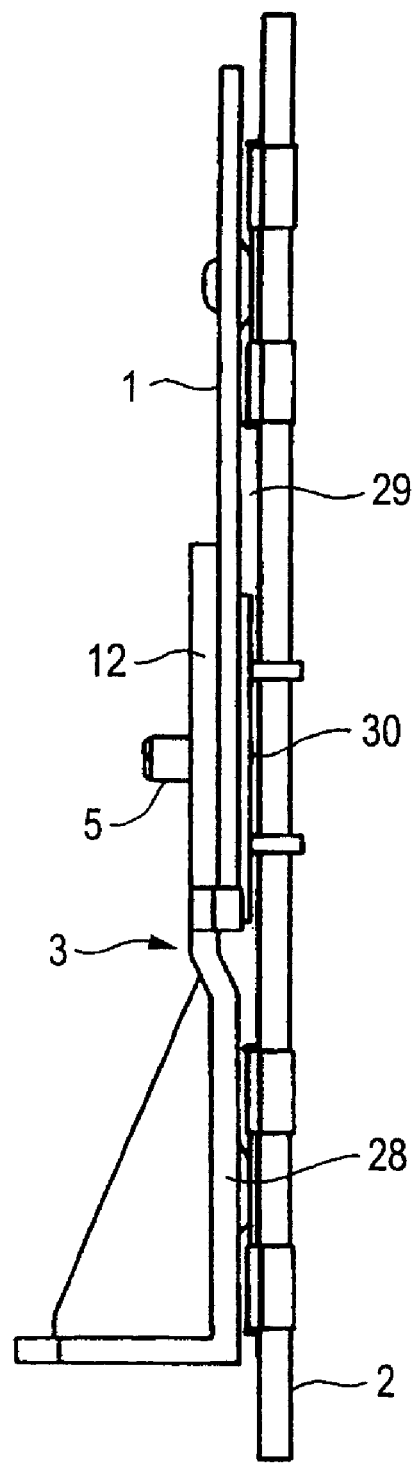
FIG. 9 is a side-elevational view showing the half angularly-moved condition of the link.
Figure 10:
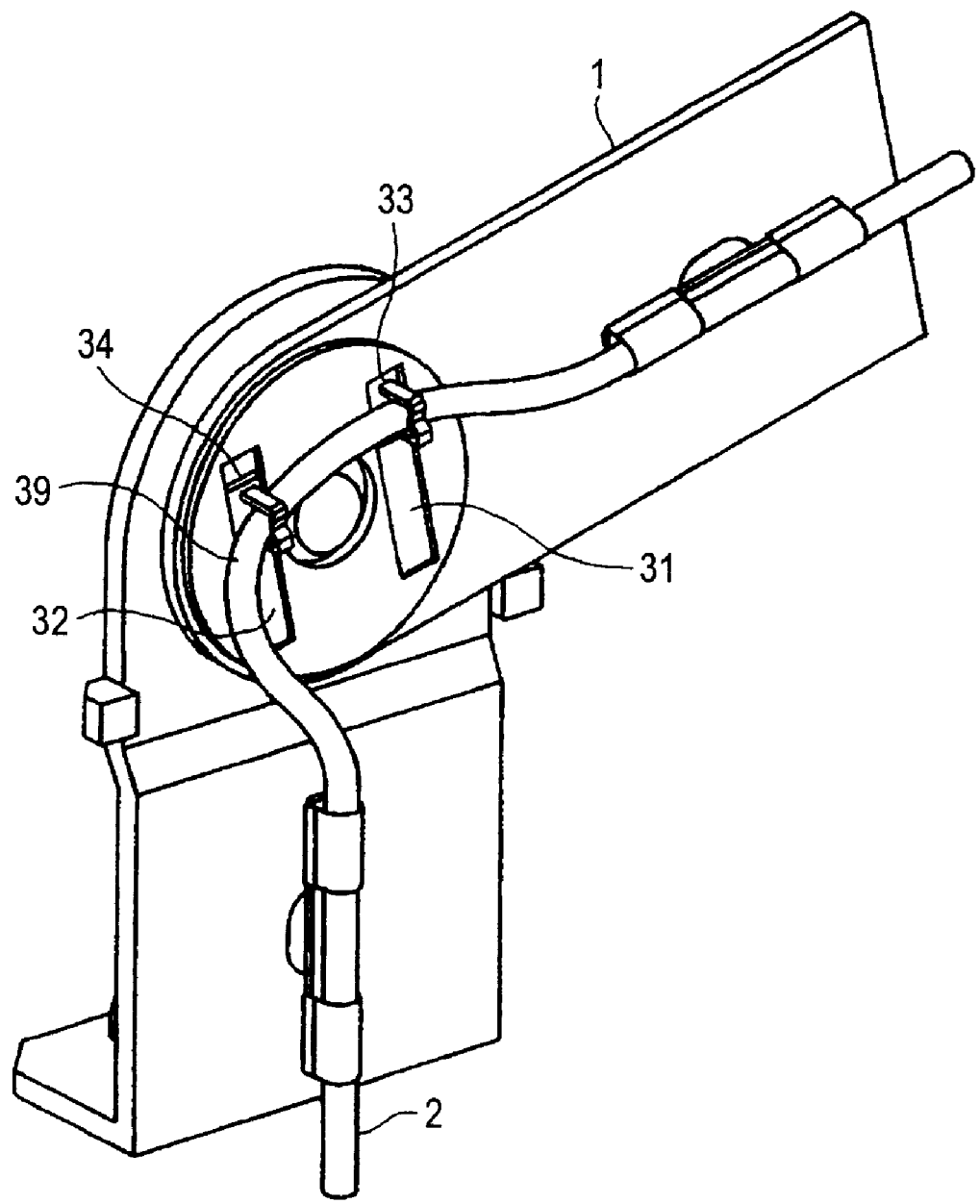
FIG. 10 is a perspective view showing a pivotal movement end position of the link.

FIG. 6 is a view showing a closed condition of a rear window (movable structural body) in which the link 1 is pivotally moved forwardly toward the front of a vehicle to be disposed in a slightly upwardly-slanting position relative to a horizontal direction, FIG. 7 is a cross-sectional view taken along the line B-B of FIG. 6, showing an important portion, FIGS. 8 and 9 are views showing a condition in which the link 1 stands up vertically in a half-open condition of the rear window, and FIG. 10 is a view showing an open condition of the rear window (that is, a condition in which the rear window is stored in a luggage space) in which the link 1 is pivotally moved rearwardly toward the rear of the vehicle to be disposed in a slightly upwardly-slanting position relative to the horizontal direction.

In FIG. 6, the two guide holes 31 and 32 in the base plate 30 are disposed generally perpendicular to a longitudinal axis of the link 1, and are slightly inclined rearwardly relative to a vertical direction, and the two sliders 33 and 34 are positioned respectively at upper end portions of the guide holes 31 and 32. The guide holes 31 and 32 are equidistant from the center of the shaft portion 5. In the example of FIG. 6, although the rear slider 34 is positioned slightly below the upper end of the guide hole 32, the rear slider 34 may be positioned at the uppermost end of the guide hole 32, depending on the bent condition of the wire harness 2.

At a region between a fixing member 10 on a link bracket 3 and a fixing member 10 on the link 1, the wire harness 2 is curved upwardly rearwardly, and is held by the clamp portions 9 of the two sliders 33 and 34 disposed at an upper portion of the base plate 30 in parallel relation to each other, so that a large radius of bending of the wire harness is maintained.

As shown in FIG. 7, the base plate 30 is immovably fixed to the link 1, and the shaft portion 5 extends through a central hole 14 in the base plate 30, and pivotally movably connects the link 1 to the link bracket 3. Each of the guide holes 31 and 32 has a step portion 15 formed intermediate of a depth thereof, and is closed at its bottom opening by a flat surface of the link 1, and slidably holds a base plate portion 35 of the slider 33, 34. The two guide holes 31 and 32 have the same length and the same width, and are disposed symmetrically with respect to the shaft portion 5.

In the process of opening the rear window by driving the link 1 from the position of FIG. 6, the link 1 stands up vertically in line with the link bracket 3 as shown in FIG. 8, and at this time that portion of the wire harness 2 lying between the two fixing members 10 is bent into a generally S-shape (generally crank-shape) in contiguous relation to the surface of the base plate 30. At this time, the base plate 30 angularly moved together with the link 1, and the two guide holes 31 and 32 of the base plate 30 are positioned respectively at the upper and lower sides, and the upper slider 33 (in FIG. 6) moves to the front end of the upper guide hole 31 (in FIG. 8), while the lower slider 34 (in FIG. 8) does not much move from its position of FIG. 6, and is positioned at the rear end of the lower guide hole 32. That portion of the wire harness 2 lying between the upper and lower sliders 33 and 34 passes the center of the shaft portion 5.

Thus, in accordance with the pivotal movement of the link 1, the two sliders 33 and 34 are moved sideways in the opposite directions, respectively, and the wire harness 2 is two-dimensionally bent symmetrically (into the generally S-shape), so that the surplus length portion (bending portion) of the wire harness 2 is set to an increased length, and the bending of the wire harness can be effected while leaving a leeway (The bent portion in FIG. 6 is indicated by reference numeral 36, and the bent portion in FIG. 8 is indicated by reference numerals 37 and 38).

As shown in FIG. 9, the wire harness 2 extends along the link 1 and a lower half portion 28 of the link bracket 3 in parallel relation thereto, with a slight gap 29 formed therebetween. The base plate 30 is held in intimate contact with the link 1, and is fixed to the link 1 by small screws 16 (FIG. 6) or the like, and the link 1 is pivotally moved about the shaft portion 5 in sliding contact with an upper half portion 12 of the link bracket 3.

When the link 1 is further pivotally moved rearwardly from the condition of FIG. 8, the link 1 is directed rearwardly in a slightly upwardly slanting condition as shown in FIG. 10, and the wire harness 2 is curved upwardly forwardly in symmetrical relation to the wire harness 2 of FIG. 6, and the two sliders 33 and 34 move respectively to the upper end portions of the generally upwardly-extending guide holes 31 and 32, so that a bent portion 39 of the wire harness 2 is smoothly curved with a large radius. In the example of FIG. 10, although the front slider 34 is disposed slightly below the upper end of the guide hole 32, the front slider 34 may be positioned at the uppermost end of the guide hole 32, depending on the bent condition of the wire harness 2.

The upper slider 33 (in FIG. 8) does not move relative to the guide hole 31, and shifts to a condition shown in FIG. 10, and the lower slider 34 (in FIG. 8) much moves along the guide hole 32, and is disposed generally parallel to the rear slider 33 in the horizontal direction as shown in FIG. 10.

As the link 1 is pivotally moved forwardly from the condition of FIG. 10, the wire harness 2 is bent into a generally reversed S-shape in forward-rearward symmetrical relation to the S-shape of FIG. 8 at the time when the link 1 is brought into the upstanding position. Namely, the upper slider 33 (in FIG. 8) is positioned at the rear end of the upper guide hole 31, while the lower slider 34 is positioned at the front end of the lower guide hole 32. Then, the wire harness is restored into the condition of FIG. 6.

In the above second embodiment, in the upstanding position of the link 1 (where the link 1 is disposed in line with the link bracket 3), the wire harness 2 is bent into the generally S-shape, and the surplus length portion of the wire harness 2 is increased so that the bending of the wire harness can be effected while leaving a leeway, and by doing so, a fatigue of the wire harness 2 due to the bending is reduced, and the reliability of continuous supply of electric power is enhanced.

Furthermore, when the link 1 is pivotally moved rearwardly, the wire harness 2 is bent into the generally S-shape as shown in FIG. 8, and when the link 1 is pivotally moved forwardly from the condition of FIG. 10, the wire harness 2 is bent into the generally reversed S-shaped. Thus, the path of the bent wire harness is not constant (that is, there are the two paths), and therefore the wire harness 2 will not get curled, and the bending fatigue of the wire harness 2 is further reduced.

FIGS. 11 to 16 show a third embodiment of an installation structure (of installing a wire harness on a link) of the invention.

This structure is characterized in that two harness clamp portions 9 and 9' are integrally connected together by a base plate portion 41 of one slider 40, and can be slidingly moved simultaneously in the same direction along a guide hole (guide portion) 43 in a circular base plate 42 provided at one end portion 6 of the link 1. The other construction is similar to that of the first embodiment of FIGS. 1 to 5, etc., and similar constituent portions will be designated by identical reference numerals, respectively, and detailed explanation thereof will be omitted.

Figure 11:
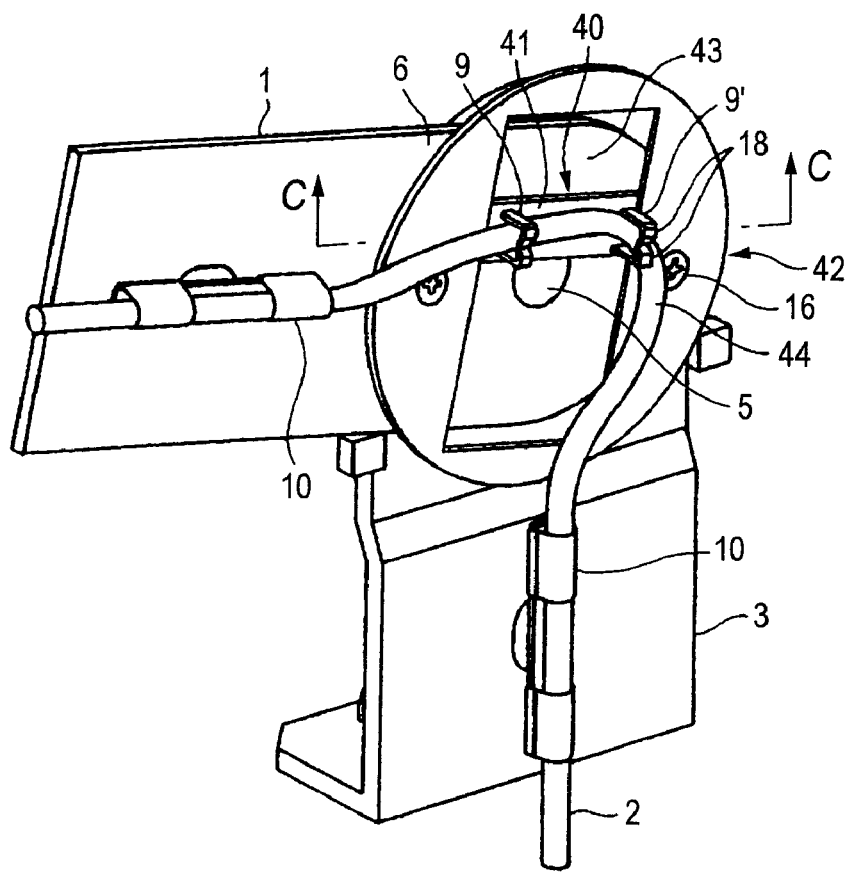
FIG. 11 is a perspective view of a third embodiment of a wire harness installation structure of the invention, showing a pivotal movement start position of a link.
Figure 12:
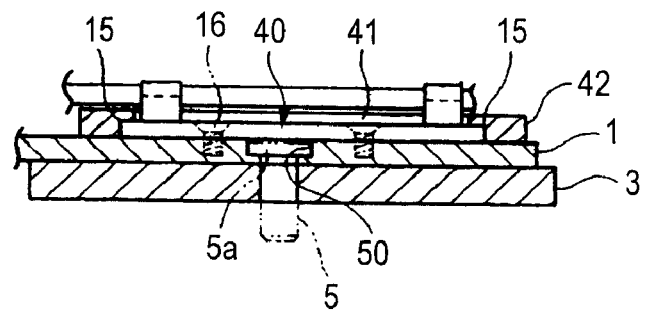
FIG. 12 is a cross-sectional view taken along the line C-C of FIG. 6.
Figure 13:
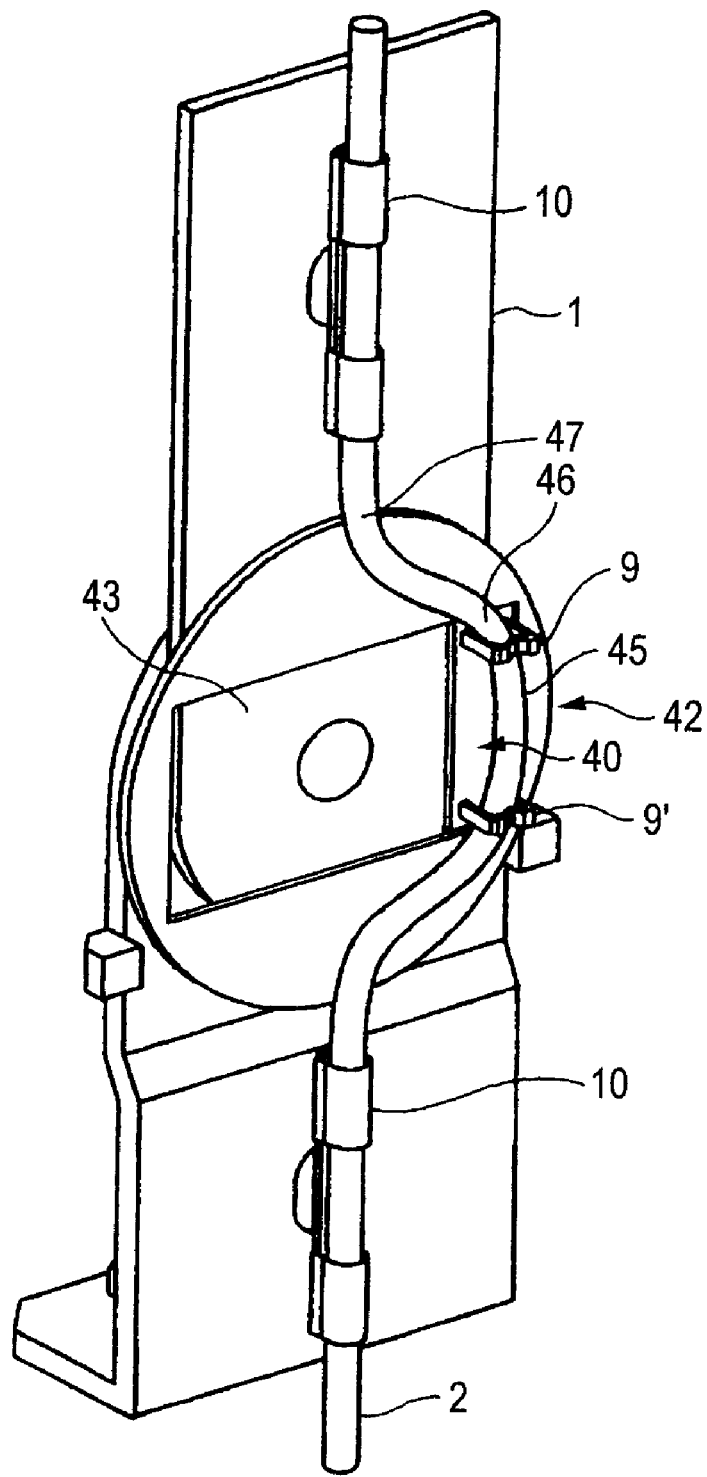
FIG. 13 is a perspective view showing a half angularly-moved condition of the link of the third embodiment.
Figure 14:
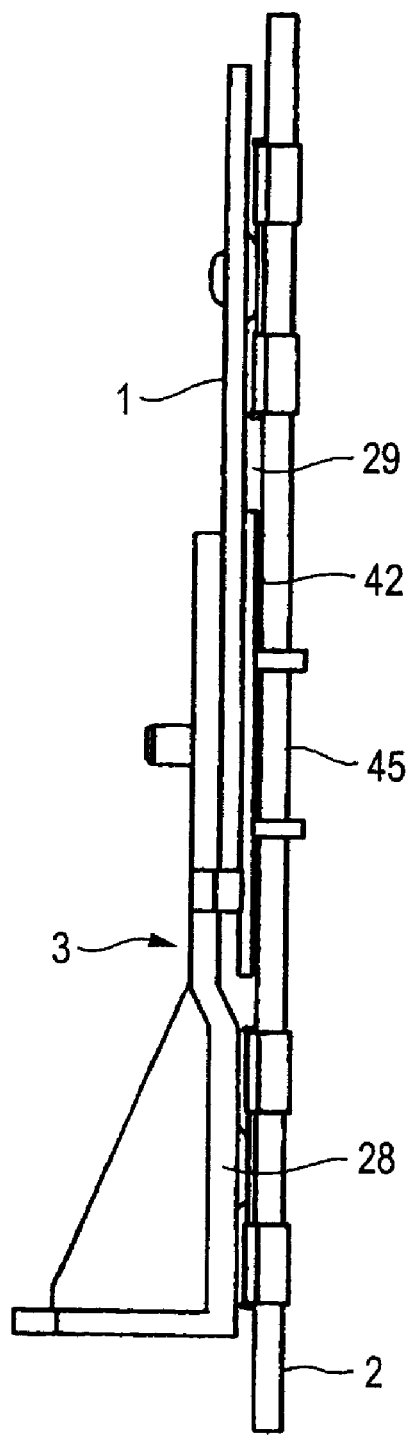
FIG. 14 is a side-elevational view showing the half angularly-moved condition of the link.
Figure 15:
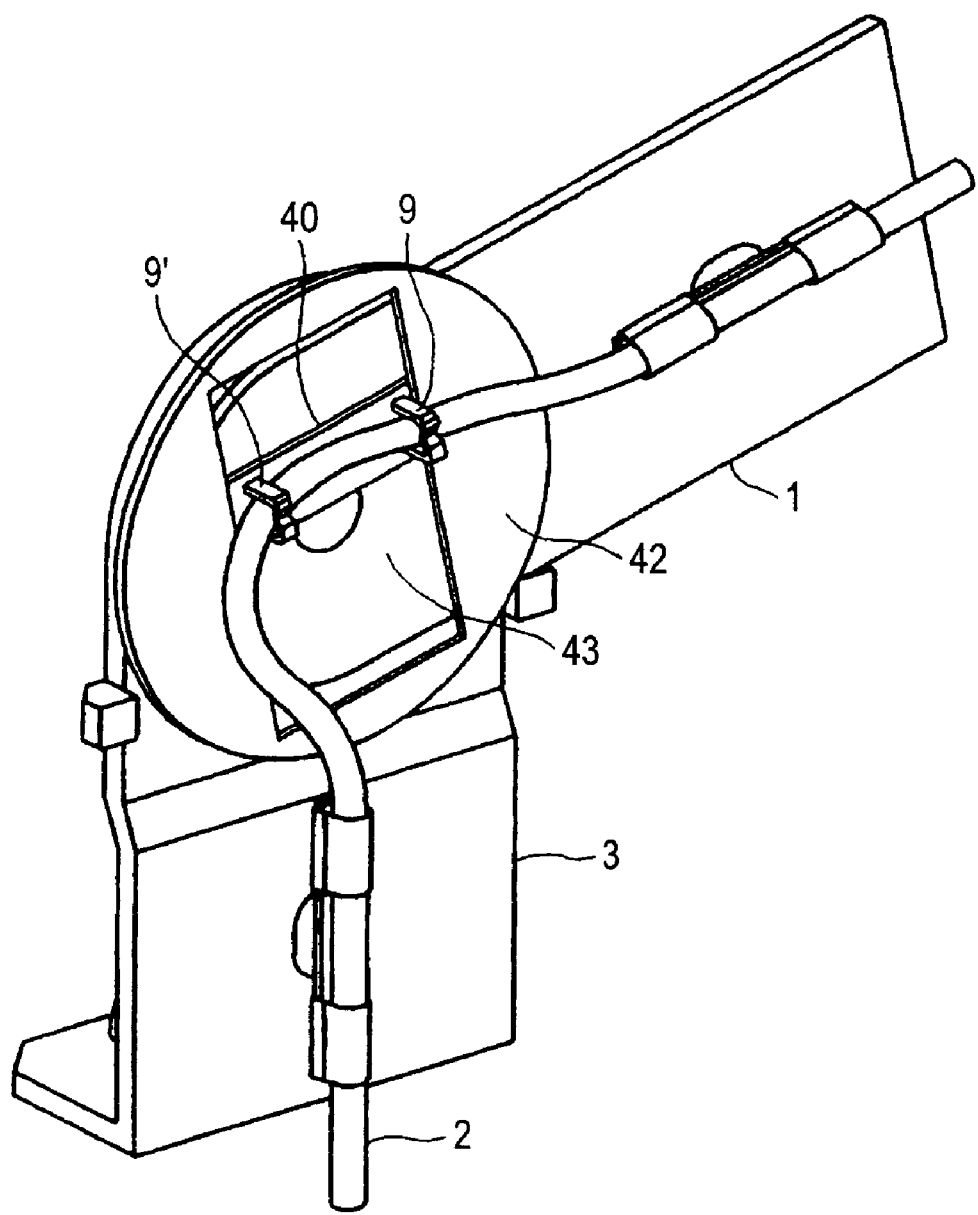
FIG. 15 is a perspective view showing a pivotal movement end position of the link.
Figure 16:
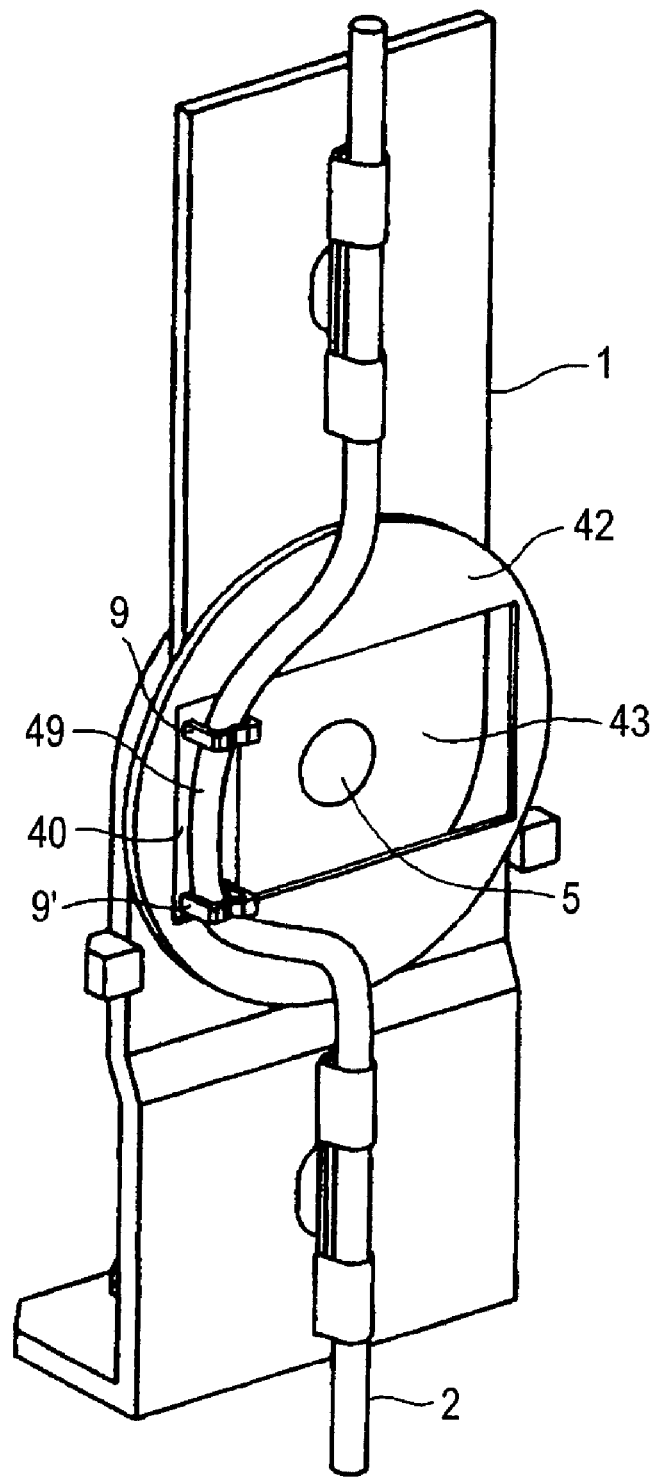
FIG. 16 is a perspective view showing a condition in which the link is half angularly moved in a reverse direction from the pivotal movement end position.

FIG. 11 is a view showing a closed condition of a rear window (movable structural body) in which the link 1 is pivotally moved forwardly toward the front of a vehicle to be disposed in a slightly upwardly-slanting position relative to a horizontal direction, FIG. 12 is a cross-sectional view taken along the line C-C of FIG. 11, showing an important portion, FIGS. 13 and 14 are views showing a condition in which the link 1 stands up vertically in a half-open condition of the rear window, FIG. 15 is a view showing an open condition of the rear window (that is, a condition in which the rear window is stored in a luggage space) in which the link 1 is pivotally moved rearwardly toward the rear of the vehicle to be disposed in a slightly upwardly-slanting position relative to the horizontal direction, and FIG. 16 is a view showing a condition in which the link 1 is pivotally moved forwardly from the position of FIG. 15 so as to close the rear window, and stands up in a half-closed condition of the rear window.

The slider 40 comprises the base plate portion 41 of a rectangular shape, and the clamp portions 9 and 9' formed on and projecting respectively from opposite end portions of the base plate portion 41. Each of the clamp portions 9 and 9' comprises a pair of elastic retaining piece portions 18. The guide hole 43 in the base plate 42 has a wide rectangular shape, and opposed inner longitudinal surfaces of the guide hole 43 are stepped intermediate of a height thereof to provide step portions 15 (FIG. 12), and the guide hole 43 is closed at its bottom opening by a flat surface of the link 1 to provide a guide groove.

The two clamp portions 9 and 9' are arranged in parallel opposed relation to each other, and the wire harness 2 is passed through the clamp portions 9 and 9' such that that portion of the wire harness 2 lying between the two clamp portions 9 and 9' extends generally straight (in a slightly-curved manner). In the case where the strength of the base plate 42 is decreased because of the provision of the wide guide hole 43, there can be provided an arrangement in which a guide groove is formed in a relatively-thick base plate (not shown), and sliding portions (opposite end portions) of the slider 40, while elastically deformed, are fitted into the guide groove. In the example of FIG. 11, the base plate 42 is made larger in diameter than the base plates of the other embodiments, thereby increasing the amount of sliding movement of the slider 40.

In FIG. 11, the guide hole 43 is disposed perpendicular to the link 1, and is positioned generally vertically, and the slider 40 is positioned below the upper end of the guide hole 43, and at a region between two fixing members 10, the wire harness 2 held by the two clamp portions 9 and 9' is curved upwardly rearwardly with a large radius. An upper portion of a bent portion 44 of the wire harness 2 is gripped by the two clamps 9 and 9', and is disposed generally horizontally.

As shown in FIG. 12, the opposite end portions (sliding portions) of the rectangular base plate portion 41 of the slider 40 are slidably engaged respectively with the step portions 15 formed respectively at the opposed inner longitudinal surfaces of the wide guide hole 43 in the base plate 42. The base plate 42 is fixed to the link 1 by small screws 16 or the like, and the link 1 is pivotally supported on a link bracket 3 by a shaft portion 5. A larger-diameter head 5a of the shaft portion 5 is received in a stepped hole 50 in the link 1 so as not to interfere with the slider 40. There can be provided the arrangement in which not the guide hole but the guide groove is formed in the relatively thick base plate, and the slider 40 is slidably fitted in this guide groove.

When the link 1 is pivotally moved clockwise rearwardly from the condition of FIG. 11 to stand up as shown in FIG. 13, the guide hole 43 is disposed horizontally, and the slider 40 moves to the rear end of the guide hole 43, and is disposed vertically, and at the region between the upper and lower fixing members 10, the wire harness 2 held by the upper and lower clamp portions 9 and 9' of the slider 40 is bent into a generally mountain-shape or generally trapezoidal shape (This bent portion is designated by reference numeral 45). The wire harness 2 is bent into a generally arc-shape at each clamp portion 9, 9' (This bent portion is designated by reference numeral 46), and that portion of the wire harness 2 lying between the clamp portion 9 and the upper fixing member 10, as well as that portion of the wire harness 2 lying between the clamp portion 9' and the lower fixing member 10, is bent into a generally arc-shape (This bent portion is designated by reference numeral 47) in a direction opposite to the direction of bending of the bent portion 46.

As shown in FIG. 14, the wire harness 2 is disposed parallel to the link 1 and a lower half portion 28 of the link bracket 3, with a slight gap 29 formed therebetween, and the wire harness 2 is bent to much project horizontally along the base plate 42 (The bent portion is designated by reference numeral 45).

When the link 1 is further pivotally moved rearwardly, the slider 40 is moved from the rear end of the guide hole 43 (in FIG. 13) toward the upper end of the guide hole 43 (in FIG. 15) as shown in FIG. 15. The upper clamp portion 9 (in FIG. 13) is positioned at the rear side, while the lower clamp portion 9' (in FIG. 13) is positioned at the front side. At this time, the position of the slider 40, as well as the shape of the wire harness 2, is forward-rearward symmetrical relative to the position of the slider 40 and the shape of the wire harness 2 in FIG. 11. The wire harness 2 is bent forwardly upwardly (This bent portion is designated by reference numeral 48).

When the link 1 is pivotally moved counterclockwise forwardly from the condition of FIG. 15, the link 1 is brought into the upstanding position, and at this time the slider 40 continues to move in the same direction as the direction of movement of the slider 40 in FIG. 15, and is positioned at the front end of the guide hole 43 as shown in FIG. 16, and the wire harness 2 is bent into a generally mountain-shape or generally trapezoidal shape which is forward-rearward symmetrical relative to the shape of the wire harness 2 of FIG. 13 (This bent portion is designated by reference numeral 49). The rear clamp portion 9 (in FIG. 15) is positioned at the upper side (in FIG. 16), while the front clamp portion 9' (in FIG. 15) is positioned at the lower side (in FIG. 16).

When the link 1 is further pivotally moved counterclockwise forwardly from the condition of FIG. 16, the slider 40 is moved in the reverse direction, and passes over the shaft portion 5, and is positioned at the upper portion of the guide hole 43 as shown in FIG. 11.

In the above third embodiment, the wire harness 2 is firmly held by the two clamp portions 9 and 9' movable in unison, and therefore the wire harness 2 is bent into the generally trapezoidal shape such that this bent portion has a relatively large size, and the folding of the wire harness 2, the excessive concentration of stresses on the wire harness, etc., can be positively prevented. And besides, the direction of bending of the wire harness 2 varies depending on the direction of pivotal movement of the link 1, and therefore the wire harness 2 will not get curled, and the bending fatigue of the wire harness is reduced.

In the above third embodiment, although the two clamp portions 9 and 9' are integrally connected together, the wire harness 2 can be bent in a similar manner as described above, using a small-width slider with one clamp portion and a narrow guide hole (guide portion). In this case, also, the slider passes over the shaft portion 5, and the head 5a of the shaft portion 5 is completely received within the stepped hole 50 (FIG. 12) so as not to interfere with the slider.

FIGS. 17 to 21 show a fourth embodiment of an installation structure (of installing a wire harness on a link) of the invention.

Referring to features of this structure, a guide rail (guide portion) 62 of a generally mountain-shape is formed on a circular base plate 61 provided at one end portion of the link 1, and projects from the base plate 61 in a direction of an axis thereof, and a slider 63 holding the wire harness 2 through a clamp portion 9 can be moved along the guide rail 62 between diametrically-opposite end portions of the base plate 61 such that the slider 63 can move three-dimensionally, that is, in a radial direction and also in a direction of the thickness of the base plate 61. The other construction is similar to that of the first embodiment of FIGS. 1 to 5, etc., and similar constituent portions will be designated by identical reference numerals, respectively, and detailed explanation thereof will be omitted.

Figure 17:
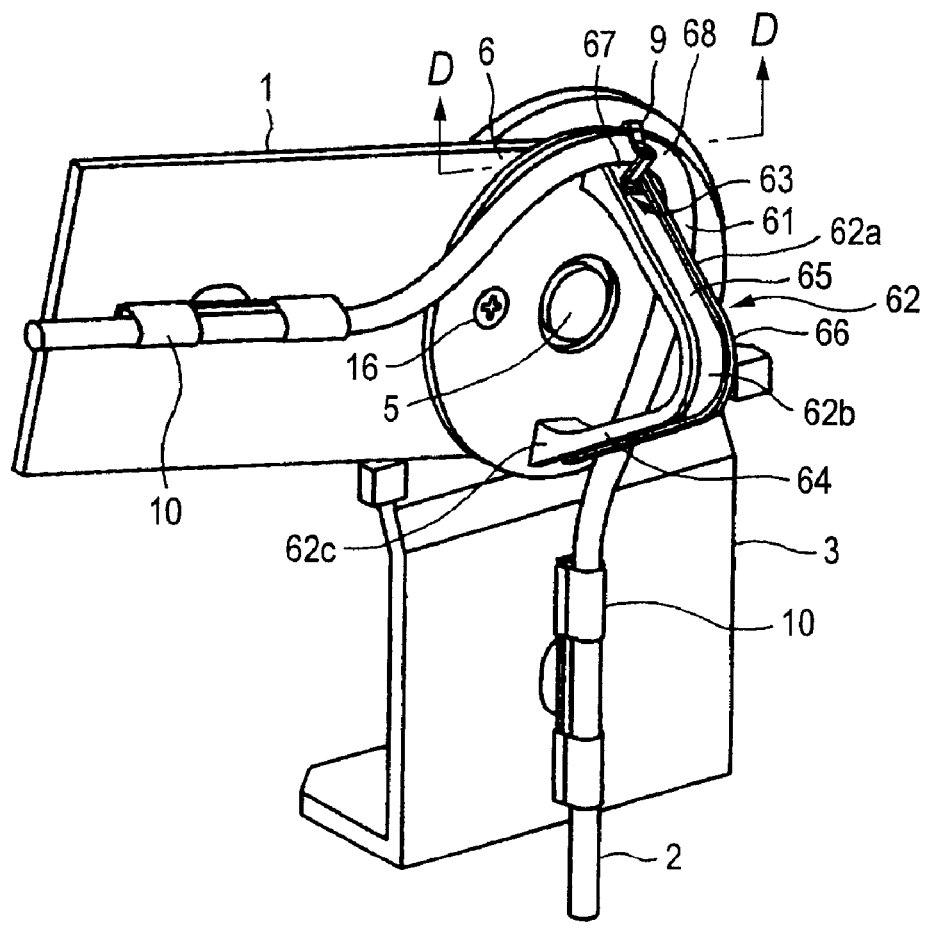
FIG. 17 is a perspective view of a fourth embodiment of a wire harness installation structure of the invention, showing a pivotal movement start position of a link.
Figure 18:
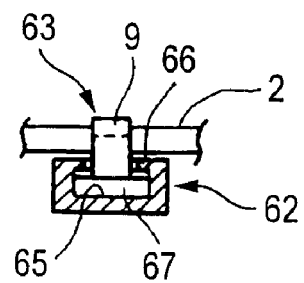
FIG. 18 is a cross-sectional view taken along the line D-D of FIG. 6.
Figure 19:
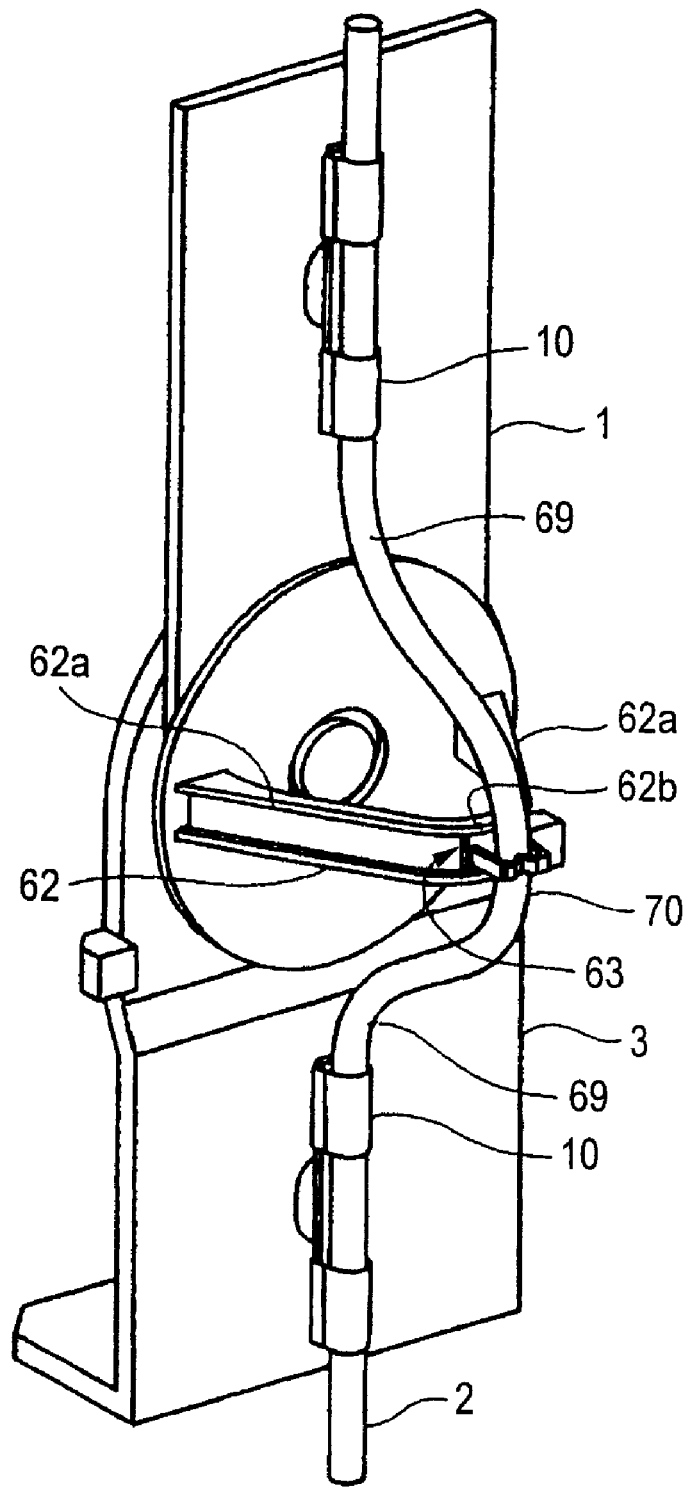
FIG. 19 is a perspective view showing a half angularly-moved condition of the link of the fourth embodiment.
Figure 20:
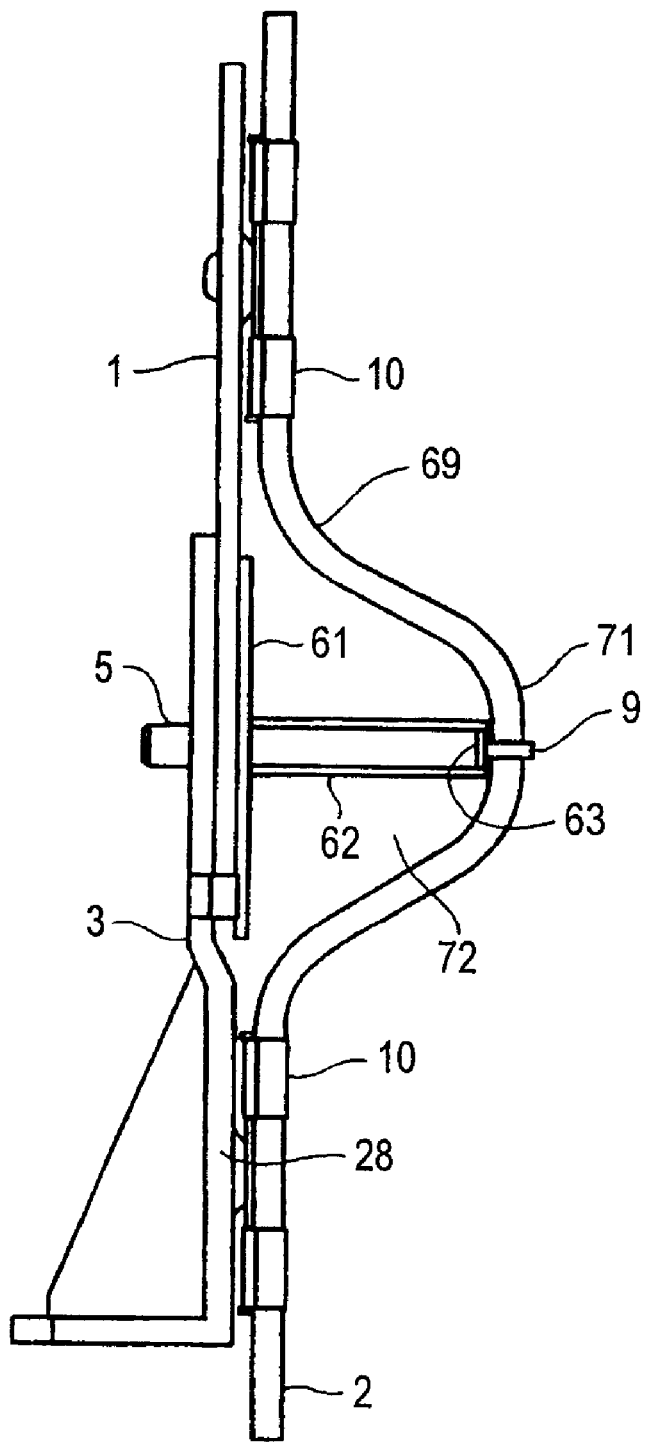
FIG. 20 is a side-elevational view showing the half angularly-moved condition of the link.
Figure 21:
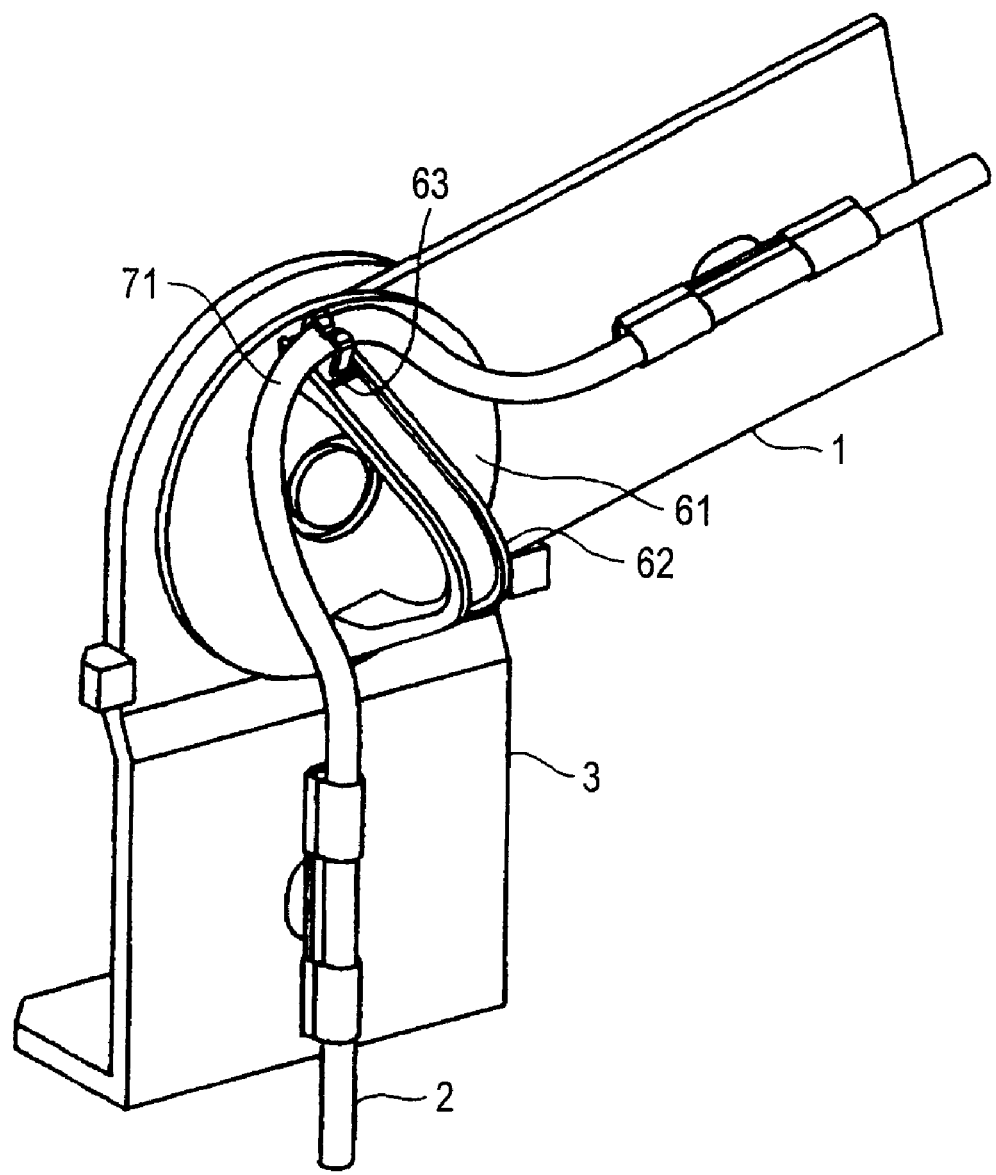
FIG. 21 is a perspective view showing a pivotal movement end position of the link.
Figure 22:
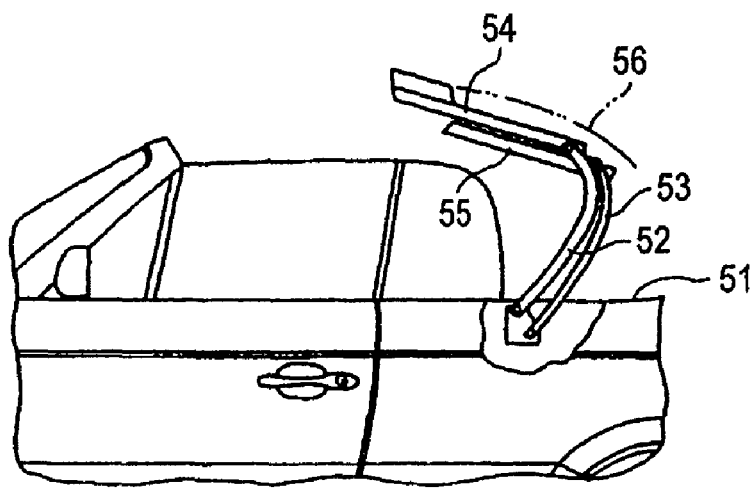
FIG. 22 is a front-elevational view showing one form of movable structural body storage structure using a conventional link mechanism.
Figure 23:
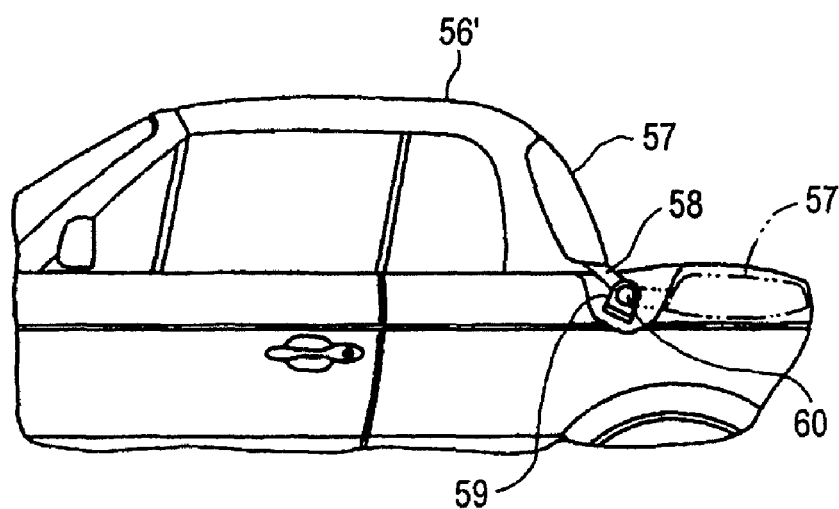
FIG. 23 is a front-elevational view showing another form of movable structural body storage structure using a link mechanism.

FIG. 17 is a view showing a closed condition of a rear window (movable structural body) in which the link 1 is pivotally moved forwardly toward the front of a vehicle to be disposed in a slightly upwardly-slanting position relative to a horizontal direction, FIG. 18 is a cross-sectional view taken along the line D-D of FIG. 17, showing a slider portion, FIGS. 19 and 20 are views showing a condition in which the link 1 stands up vertically in a half-open condition of the rear window, and FIG. 21 is a view showing an open condition of the rear window (that is, a condition in which the rear window is stored in a luggage space) in which the link 1 is pivotally moved rearwardly toward the rear of the vehicle to be disposed in a slightly upwardly-slanting position relative to the horizontal direction.

As shown in FIG. 17, the guide rail 62 includes a long wall portion 64 bent into a generally mountain-shape, and a guide groove 65 formed at an outer surface (front surface) of the wall portion 64. The guide rail 62 also includes two inclined portions 62a, and an arc-shaped apex portion 62b disposed between the two inclined portions 62a. Foot portions (distal end portions) 62c of the two inclined portions 62a are continuous with the base plate 61 in intersecting relation thereto.

As shown in FIG. 18, the guide groove 65 has step portions (flange portions) 66 at its opening portion, and opposite end portions of a base plate portion 67 of the slider 63 are fitted into the guide groove while elastically deformed. As in the above embodiments, the guide groove 65 can be formed using a stepped guide hole in a first member (not shown) and a second member (not shown) closing this guide hole. The outer side portion and the inner side portion of the guide rail 62 are formed by the two members.

Preferably, a gap is provided between the guide groove 65 and the base plate portion 67 of the slider 63 so that the slider 63 can smoothly moved even at the vicinity of the apex portion of the guide rail 62. The radius of curvature of the apex portion of the guide rail 62 is made sufficiently large that the slider 63 can smoothly move along this apex portion.

The guide rail 62 can be formed not into the generally inverted V-shape but into a generally arc-shape (a generally semi-circular or generally mountain-shape). In this case, if the base plate portion 67 of the slider 63 is formed into a arc-shape conforming to the arc-shape of the guide rail (the guide groove), there is no need to provide a gap between the base plate portion 67 and the guide groove. In the example of FIG. 17, the guide rail 62 may be molded integrally with the base plate 61, using a resin, or a separate guide rail 62 may be fixed to a metallic base plate 61 by screws, welding or any other suitable means.

In FIG. 17, the guide rail 62 is disposed generally perpendicular to the longitudinal axis of the link 1, and is positioned generally vertically (in the upward-downward direction), and the slider 63 is positioned at the upper end of the guide rail 62, and at a region between two fixing members 10, the wire harness 2 held by the clamp portion 9 of the slider 63 is bent rearwardly upwardly (This bent portion is designated by reference numeral 68).

As the link 1 is pivotally moved clockwise rearwardly from the condition of FIG. 17, the guide rail 62 is angularly moved together with the base plate 61, so that the slider 63 moves along the guide rail 62, and when the link 1 is brought into the upstanding position as shown in FIG. 19, the guide rail 62 is positioned horizontally, and the slider 63 rises or moves along the rear inclined portion 62a (in FIG. 19) of the guide rail 62 to reach the apex portion 62b, and the wire harness 2 is supported at three points, that is, by the fixing member 10 on the link 1, the slider 63 and the fixing member 10 on a link bracket 3 in such a manner that the wire harness 2 assumes a gently-curved mountain-like shape, and a slider (63)-side bent portion 70 is smoothly continuous with each fixing member (10)-side bent portion 69 in such a manner that the two bent portions 70 and 69 are bent in opposite directions, respectively.

As shown in FIG. 20, the link 1 and a lower half portion 28 of the link bracket 3 are disposed in a common plane, and those portions of the wire harness 2 disposed respectively at the upper and lower fixing members 10 are installed respectively along the link 1 and the lower half portion 28 of the link bracket 3 in parallel relation thereto, and that portion of the wire harness 2 disposed over the base plate 61 is projected in the direction of the axis of the base plate 61 into the generally mountain-shape by the guide rail 62. The guide rail 62 is fixed to the base plate 61 by small screws 17 (FIG. 17) or the like, and the link 1 is pivotally connected to the link bracket 3 by a shaft portion 5.

When the link 1 is further pivotally moved rearwardly from the condition of FIG. 19, the guide rail 62 is positioned in forward-rearward symmetrical relation to the guide rail 62 of FIG. 17 as shown in FIG. 21, and the slider 63 moves down from the apex portion 62b of the guide rail 62 along the front inclined portion 62a (in FIG. 19), and reaches the upper end of the guide rail 62 (in FIG. 21). The upper end of the guide rail 62 (in FIG. 21) corresponds to the lower end of the guide rail 62 (in FIG. 17). In the process of FIGS. 17 to 21, the slider 63 has moved from one end of the guide rail 62 to the other end thereof. The wire harness 2 of FIG. 21 is bent or curved forwardly upwardly in forward-rearward symmetrical relation to the wire harness 2 of FIG. 17 (This bent portion is designated by reference numeral 71).

As the link 1 is pivotally moved counterclockwise forwardly from the condition of FIG. 21, the slider 63 is moved back along the above path, that is, moved along the guide rail 62 via the apex portion 62b to the start end (upper end) of FIG. 17.

In the fourth embodiment, although the guide rail 62 is formed on the base plate 61, the provision of the base plate 61 can be omitted, in which case the guide rail 62 is formed at the end portion of the link 1. In the example of FIG. 17, the base plate 61 is made larger in diameter than the width of the link 1, thereby increasing the amount of sliding movement of the slider along the guide rail 62. An operation for passing the shaft portion 5 through a hole in the link 1 can be effected smoothly since the guide rail 62 is formed integrally with the base plate 61, and is separate from the link 1, and therefore will not interfere with this passing operation (The shaft portion 5 is passed through the hole before the base plate 61 is attached to the link 1). In case the base plate 61 is attached to the link 1 before the passing operation, the shaft portion 5 is introduced into an internal space 72 (FIG. 20) of a mountain-like shape defined by the guide rail 62, and then is passed through the hole in the link 1.

In the above fourth embodiment, although the guide rail 62 is formed in a bridge-like manner on the base plate 61, with the space 72 formed therebetween, a guide portion can be formed along a contour of a generally flat (slightly mountain-like) wall portion without forming the space 72 between the guide rail and the base plate 61.

In the above fourth embodiment, the slider 63 is moved three-dimensionally along the guide rail 62, and the wire harness 2 held by the slider 63 is bent in the direction perpendicular to the direction of pivotal movement of the link 1 (that is, in the direction of the thickness of the link), and by doing so, the wire harness 2 can be bent to the desired height, that is, into a large size, and therefore the increased surplus portion (bending portion) of the wire harness 2 can be secured, and the concentration of stresses on the bent portion is reduced, so that the durability can be enhanced.

In the above embodiments, although the link 1 is pivotally connected to the fixed link bracket (mating member) 3, the link bracket (mating member) can be replaced by a movable link similar to the link 1, and the two links are pivotally moved relative to each other, in which case also the harness installation structures of the above embodiments can be applied.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2006-221007 filed on Aug. 19, 2006, the contents of which are incorporated herein for reference.

What is claimed is:

1. An installing structure of a wire harness, comprising:
   a link which has an end portion and is pivotally connected to a mating member by a shaft portion provided on the end portion,
   wherein the wire harness extended from the mating member is installed along the link;
   wherein a guide portion is provided at the end portion of the link;
   wherein a slider for holding the wire harness is slidably engaged in the guide portion;
   wherein a base plate is provided on the end portion of the link; and
   wherein the guide portion is provided in the base plate.

2. The installing structure according to claim 1, wherein a pair of the guide portions are respectively provided at opposite sides of the shaft portion, and are extended straight;
   wherein a pair of the sliders are engaged in the pair of guide portions, respectively; and
   wherein a part of the wire harness installed at the end portion has a surplus length.

3. The installing structure according to claim 1, wherein the guide portion extends straight so as to pass a center of the shaft portion;
   wherein the slider for holding the wire harness by its at least one clamp portion is engaged in the guide portion; and
   wherein a part of the wire harness installed at the end portion has a surplus length.

4. The installing structure according to claim 1, wherein the guide portion projects into a generally L shape in an axis direction of the shaft portion; and
   wherein a part of the wire harness installed at the end portion has a surplus length.

5. An installing structure of a wire harness, comprising:
   a link which has an end portion and is pivotally connected to a mating member by a shaft portion provided on the end portion,
   wherein the wire harness extended from the mating member is installed along the link;
   wherein a guide portion is provided at the end portion of the link;
   wherein a slider for holding the wire harness is slidably engaged in the guide portion; and
   wherein the guide portion has a generally arc-shape, and is disposed in concentric relation to the shaft portion.

6. An installing structure of a wire harness, comprising:
   a link which has an end portion and is pivotally connected to a mating member by a shaft portion provided on the end portion,
   wherein the wire harness extended from the mating member is installed along the link;
   wherein a guide portion is provided at the end portion of the link;
   wherein a slider for holding the wire harness is slidably engaged in the guide portion; and
   wherein the slider is configured to be slid along the guide when the link is pivoted relative to the mating member.

* * * * *